United States Patent [19]

Culver et al.

[11] Patent Number: 5,346,614
[45] Date of Patent: Sep. 13, 1994

[54] REMOVAL OF HYDROGEN SULFIDE FROM AN OIL-CONTAINING MIXTURE HAVING A CONTINUOUS AQUEOUS PHASE

[75] Inventors: Christohper R. Culver, Fillmore; Clifford D. Juengst, Aliso Viejo, both of Calif.

[73] Assignee: Union Oil Company of California, Los Angeles, Calif.

[21] Appl. No.: 974,250

[22] Filed: Nov. 10, 1992

[51] Int. Cl.$^5$ ............................................. C10G 17/08
[52] U.S. Cl. .................................. 208/242; 208/208 R; 208/219; 208/222; 208/223; 208/224; 208/225; 208/237; 210/696
[58] Field of Search .................. 208/242, 208 R, 219, 208/22, 223, 224, 225, 237; 210/696

[56] References Cited

U.S. PATENT DOCUMENTS 2,953,523  9/1960  Lehrian .
4,171,349 10/1979  Cucuiat et al. .
4,201,662  5/1980  Horton .
4,855,124  8/1989  Matsuoka et al. .
4,948,494  8/1990  Stout .

FOREIGN PATENT DOCUMENTS 156814  9/1952  Australia .
 89403  7/1975  Japan .
 57205  5/1978  Japan .
680655 10/1952  United Kingdom .

*Primary Examiner*—Johann Richter
*Assistant Examiner*—Michael B. Hydorn
*Attorney, Agent, or Firm*—Gregory F. Wirzbicki; Shlomo R. Frieman

[57] ABSTRACT

A method and system for removing hydrogen sulfide from a continuous aqueous phase-containing fluid without forming a sulfur sludge. Oil is either initially present in the fluid or added thereto.

30 Claims, 1 Drawing Sheet

5,346,614

REMOVAL OF HYDROGEN SULFIDE FROM AN OIL-CONTAINING MIXTURE HAVING A CONTINUOUS AQUEOUS PHASE

BACKGROUND

This invention relates to processes and systems for removing hydrogen sulfide from mixtures comprising a continuous aqueous phase and an oil phase, e.g., oil-in-water emulsions and partially emulsified and non-emulsified compositions which contain oil and water.

Frequently hydrogen sulfide-containing mixtures of oil and water are produced from oil wells. These mixtures are typically emulsified or partially emulsified. The hydrogen sulfide is toxic and has an unpleasant odor. In addition, aqueous hydrogen sulfide compositions are extremely corrosive, the dissolved hydrogen sulfide being capable of causing corrosion in process lines. In fact, such corrosion can result in sulfide stress cracking and/or pitting attack of steel pipes used to transport the hydrogen sulfide-containing aqueous fluids.

Accordingly, there is a need for a process and a system for removing hydrogen sulfide from oil-in-water emulsions and oil and water mixtures produced from oil wells.

SUMMARY OF THE INVENTION

The present invention provides processes and systems for removing hydrogen sulfide from oil-in-water emulsions and oil and water mixtures. Optionally, the oil-in-water emulsions and oil and water mixtures contain a gaseous phase. In accordance with one process embodiment of the invention, a sufficient amount of sulfur dioxide is introduced into an untreated oil-containing mixture having a continuous aqueous phase whose pH value is at least about 6 to form a treated oil-containing mixture having a continuous aqueous phase whose pH value is less than about 6. The pH value of the aqueous phase is measured at ambient conditions and the treated mixture is devoid of a sulfur sludge. (As used in the specification and claims, the term "sulfur sludge" means coagulated elemental sulfur that will not dissolve in the oil or water phase of the treated mixture. Generally, an oil-coated sulfur sludge concentrates at the oil-water interface of a non-emulsified water- and oil-containing mixture when the mixture is allowed to stand undisturbed. Usually, a sulfur sludge that is not coated with oil will disperse in the water phase of a non-emulsified water- and oil-containing mixture. In addition, the sulfur sludge can settle out of a stagnant water- and oil-containing non-emulsified mixture. Hence, as used in the specification and claims, the terms "substantially devoid" and "essentially devoid" in reference to the presence of a sulfur sludge in a fluid treated in accordance with the present invention mean that no separate layer of coagulated elemental sulfur is visible to the unaided eye when the fluid treated is allowed to stand undisturbed at a temperature of about 25° C. for about 24 hours.) The fact that a sulfur sludge is not formed in the process of the present invention is very important because sulfur sludge, when present, often remains dispersed in the oil- and water containing mixture due to turbulence and tends to cause plugging in water disposal wells as well as other problems if not removed.

In another process embodiment of the invention, the process comprises the steps of (a) introducing sulfur dioxide into the untreated oil-containing mixture and (b) introducing an acid into the untreated mixture. The total amount of sulfur dioxide and acid introduced into the untreated mixture is sufficient to form a treated oil-containing mixture having a continuous aqueous phase whose pH value is less than about 6.

In yet another process embodiment of the invention, the process comprises the steps of (a) introducing an acid into the untreated oil-containing mixture and (b) introducing a composition selected from the group consisting of alkali metal sulfite, alkali metal bisulfite, ammonium sulfite, ammonium bisulfite, and mixtures thereof into the untreated mixture. The total amount of acid and composition introduced into the untreated mixture is sufficient to form a treated oil-containing mixture having a continuous aqueous phase with a pH value less than about 6.

Regarding the systems of the present invention, in one version the system comprises (a) a conduit for transporting a fluid produced from an oil well; (b) an oil-containing mixture having a continuous aqueous phase in at least a portion of the conduit; and (c) a device for injecting or otherwise introducing sulfur dioxide into the mixture present in the conduit. The aqueous phase of the mixture has a pH value of at least 6 and a hydrogen sulfide concentration of at least 5 ppmw upstream from the sulfur dioxide introduction device; at least a portion of the aqueous phase of the mixture has a pH value less than 6 and a hydrogen sulfide concentration of less than 5 ppmw downstream from the sulfur dioxide introduction device; and the mixture downstream from the sulfur dioxide introduction device is devoid of a sulfur sludge.

In another version of the invention, the system comprises (a) the conduit; (b) the oil-containing mixture in at least a portion of the conduit; (c) the sulfur dioxide introduction device; and (c) a device for injecting or otherwise adding an acid to the mixture present in the conduit. The aqueous phase of the mixture has a pH value of at least 6 upstream from the acid and/or sulfur dioxide introduction devices; a hydrogen sulfide concentration of at least 5 ppmw upstream from the sulfur dioxide introduction device; at least a portion of the aqueous phase of the mixture has a pH value less than 6 downstream from the acid and/or sulfur dioxide introduction device; a hydrogen sulfide concentration of less than 5 ppmw downstream from the sulfur dioxide introduction device; and the mixture downstream from the sulfur dioxide introduction device is devoid of a sulfur sludge.

In yet another version of the invention, the system comprises (a) the conduit; (b) the oil-containing mixture in at least a portion of the conduit; (c) a device for introducing a sulfur dioxide precursor into the mixture present in the conduit; and (c) the acid introduction device. The aqueous phase of the mixture has a pH value of a least 6 upstream from the acid and/or sulfur dioxide precursor introduction devices; a hydrogen sulfide concentration of at least 5 ppmw upstream from the sulfur dioxide precursor introduction device; at least a portion of the aqueous phase of the mixture has a pH value less than 6 downstream from the acid and/or sulfur dioxide precursor introduction device; a hydrogen sulfide concentration of less than 5 ppmw downstream from the sulfur dioxide precursor introduction device; and the mixture downstream from the sulfur dioxide precursor introduction device is devoid of a sulfur sludge.

DETAILED DESCRIPTION OF THE INVENTION

Figure 1:
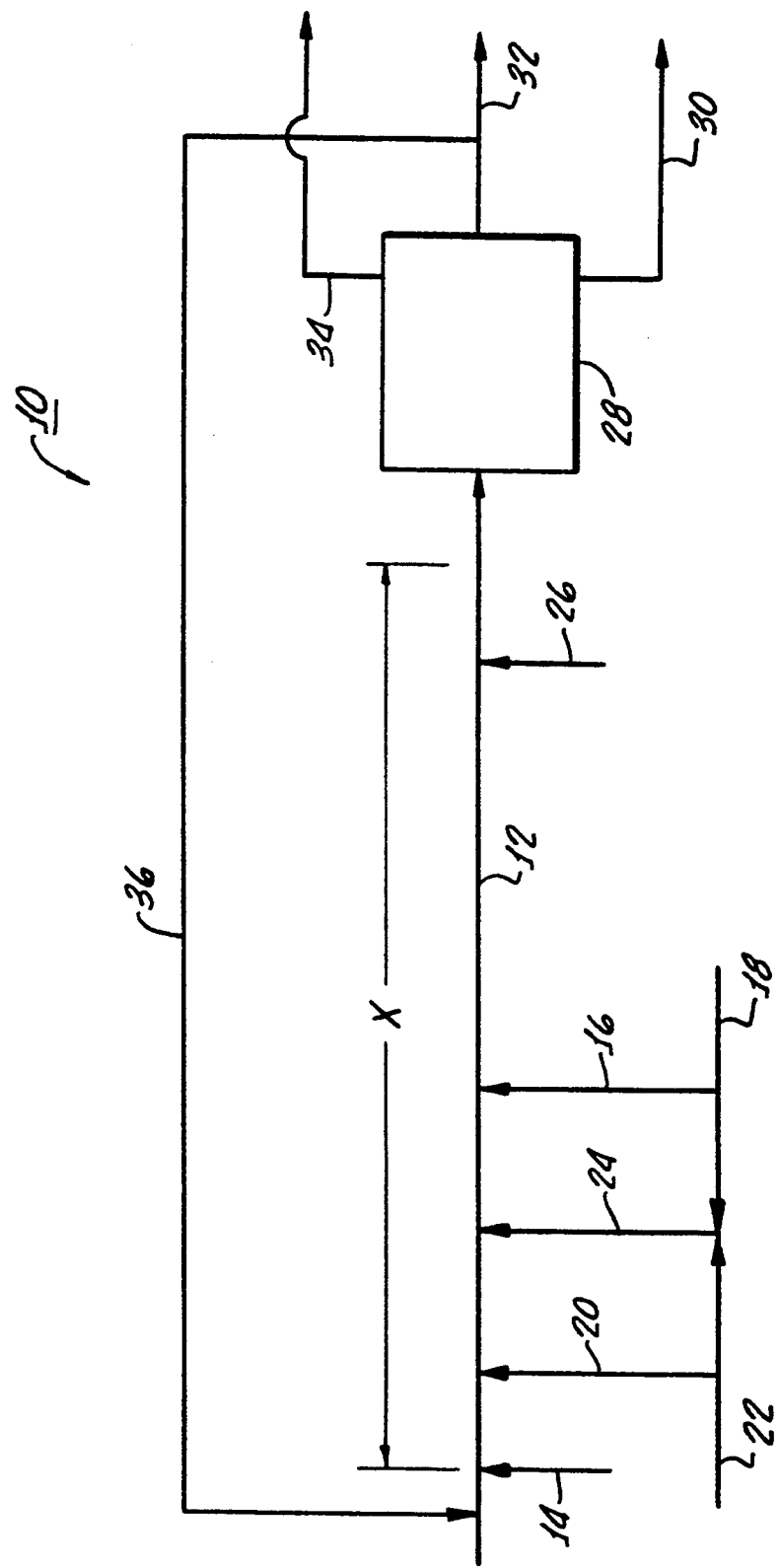
FIG. 1 is a schematic representation of a system for treating the mixture in accordance with the present invention.

With reference to the sole figure, a system 10 is employed to treat a fluid produced from an oil well (not shown). The produced fluid frequently comprises hydrogen sulfide, oil, a continuous aqueous phase, and, optionally, a gaseous phase. The pH of the aqueous phase is generally at least about 6, usually above about 6.5, and even greater than about 7. Typically, the pH of the aqueous phase of the produced fluid is less than about 9 and, more commonly, below about 8.

The hydrogen sulfide content of the produced fluid can vary from an insignificant concentration to a highly objectionable concentration. Generally, any hydrogen sulfide concentration in the aqueous phase of the produced fluid greater than about 5 ppm by weight based on the water present in the aqueous phase of the mixture is unsatisfactory. (Methods for measuring the hydrogen sulfide content of an aqueous phase are well known to those skilled in the art and, therefore, need not be elaborated upon.) In terms of the hydrogen sulfide content in the vapor phase over a sample of the produced fluid, any hydrogen sulfide concentration in the vapor phase greater than about 50 ppm by volume is deleterious. (One technique for measuring the hydrogen sulfide content of the vapor phase entails directly sampling an aliquot of fluid from a production pipeline or conduit 12 into a sealed container. The liquid portion of the sampled fluid occupies approximately ⅔ of the space in the container. The sealed container is gently agitated for about 15 to about 20 seconds. Next, a measured volume of vapor is drawn through a hydrogen sulfide detection tube (such as a Kitagawa brand hydrogen sulfide gas detector tube available from Matheson Safety Products, East Rutherford, N.J.). The hydrogen sulfide concentration in the vapor space is indicated by a color change in the detection tube.)

In one embodiment of the present invention, the produced fluid is contacted during transit through the conduit 12 with a sufficient amount of sulfur dioxide (introduced into the interior of the conduit 12 through a sulfur dioxide injector 14) to form a treated produced fluid whose aqueous phase has a pH value less than about 6, preferably less than about 5.5, more preferably less than about 5, and most preferably less than about 4.5. While the concentration of hydrogen sulfide in the treated produced fluid decreases as the pH value of the water in the treated produced fluid decreases and while the sulfur dioxide can be added at a rate sufficient to reduce the pH value of the aqueous phase of the produced fluid to below about 4, generally there is no need to reduce the pH value of the aqueous phase of the fluid to about 3 or even about 3.5.

Alternatively, the amount of sulfur dioxide added to the produced fluid is sufficient to reduce the hydrogen sulfide concentration in the aqueous phase of the treated produced fluid to less than about 5, preferably less than about 1, more preferably less than about 0.5, and most preferably less than about 0.1 ppm by weight based upon the amount of water present in the aqueous phase.

In terms of the hydrogen sulfide content in the vapor phase over a sample of the produced fluid, the amount of added sulfur dioxide is generally sufficient to reduce the hydrogen sulfide concentration in the vapor phase to less than about 50, preferably less than about 25, more preferably less than about 10, and most preferably less than about 5, ppm by volume.

In terms of moles, generally at least about 1, preferably at least about 1.5, more preferably at least about 2, and most preferably at least about 3, moles of sulfur dioxide are added to the produced fluid per mole of hydrogen sulfide present in the fluid. Usually, less than about 10, preferably less than about 9, more preferably less than about 8, and most preferably less than about 7, moles of sulfur dioxide are added to the produced fluid per mole of hydrogen sulfide present in the produced fluid. Hence, since the reaction between hydrogen sulfide and sulfur dioxide can be represented by the chemical reaction $SO_2 + 2H_2S \rightarrow 3S° + 2H_2O$, the amount of sulfur dioxide added to the produced fluid is at least about 2, preferably at least about 3, more preferably at least about 4, and most preferably at least about 6 times greater than the stoichiometric amount.

A very important feature of the present invention is that the addition of sulfur dioxide to the hydrogen sulfide-containing produced fluid does not result in the formation of a sulfur sludge. Therefore, since the sulfur dioxide-treated produced fluid is devoid of a sulfur sludge, there is no need to further process the treated produced fluid for purposes of removing a sulfur sludge.

In another embodiment of the invention, sulfur dioxide is added to the produced fluid via the sulfur dioxide injector 14 and an acid is added to the produced fluid by means of an acid injector 16, the acid being supplied from an acid source (not shown) through a conduit 18. The acid aids in reducing the pH of the produced fluid, thereby reducing the amount of sulfur dioxide required (per unit of hydrogen sulfide present in the produced fluid) to achieve a specific pH or a specific hydrogen sulfide concentration in either the aqueous phase of the treated produced fluid or the vapor phase over a sample of the treated produced fluid.

Organic and inorganic acids can be employed in this version of the invention. Exemplary organic acids include, but are not limited to, sulfonic acids (including, but not limited to, benzenesulfonic acid, toluenesulfonic acid, naphthalenesulfonic acid, and trifluoromethylsulfonic acid), carboxylic acids (such as trichloroacetic acid, trifluoroacetic acid, nitriloacetic acid, phosphonoacetic acid, and oxalic acid), and phosphonic acids (including, but not limited to, nitrilotris(methylphosphonic) acid. The preferred organic acid is naphthalenesulfonic acid.

Typical inorganic acids include, but are not limited to, hydrochloric acid, sulfuric acid, phosphoric acid, nitric acid, and sulfamic acid, with the preferred inorganic acids being sulfuric acid and hydrochloric acid.

While the acid can be added to the produced fluid before, simultaneously with, or after the addition of the sulfur dioxide to the produced fluid, usually at least a portion of the acid is added to the produced fluid either before or simultaneously during the addition of at least a portion of the sulfur dioxide to the produced fluid. Preferably, at least about 25, more preferably at least about 50, even more preferably at least about 75, and most preferably at least about 90, percent of the volume of added acid is introduced into the produced fluid before or simultaneously during the addition of the sulfur dioxide to the produced fluid.

Liquid or gaseous sulfur dioxide can be employed in the present invention. In addition, one or more sulfur dioxide precursors are optionally added to the produced fluid through a sulfur dioxide precursor injector 20, the sulfur dioxide precursor being supplied from a sulfur dioxide precursor source (not shown) through a conduit 22. Exemplary sulfur dioxide precursors include, but are not limited to, alkali metal sulfite, alkali metal bisulfite, ammonium sulfite, and ammonium bisulfite, with sodium and potassium being the preferred alkali metals.

When the sulfur dioxide precursor is employed, it must be used in conjunction with an acid, such as the organic and/or inorganic acids noted above. At least a stoichiometric amount of acid is employed with the sulfur dioxide precursor. Preferably, at least about 1.1 equivalents of acid are employed per equivalent of sulfite in the sulfur dioxide precursor.

In addition to the acid and sulfur dioxide precursor being added separately into the conduit 12 via injectors 16 and 20, respectively, the acid supply conduit 18 and the sulfur dioxide precursor supply conduit 22 can terminate in a conduit or injector 24 which injects the acid-sulfur dioxide reaction product or mixture into the conduit 12.

Because the fluids having a pH value less than about 6 tend to be corrosive, it is preferred to inject or otherwise introduce a base into the treated production fluid via a base injector 26 downstream from the sulfur dioxide, acid, sulfur dioxide precursor and acid-sulfur dioxide precursor reaction mixture injectors 14, 16, 20, and 24, respectively. A sufficient amount of base is introduced to raise the pH value of the treated production fluid to at least about 6. While the pH value of the treated production fluid can be raised to about 6.5 or even about 7 or higher, there is generally no need to do so.

Exemplary bases that can be employed in the present invention include, but are not limited to, hydroxides (including, but not limited to, sodium hydroxide, calcium hydroxide, ammonium hydroxide, and potassium hydroxide), carbonates (such as sodium carbonate, sodium bicarbonate, potassium carbonate, and potassium bicarbonate), ammonia, and amines (including, but not limited to, ethylene diamine and hexamethylene diamine).

Due to the corrosive nature of the treated production fluid prior to the addition of base, it is preferred that the portion X of the conduit 12, where the pH value of the treated production fluid is less than about 6, be constructed of a corrosion resistant material such as stainless steel (including, but not limited to, stainless steel grades 316L, E-Brite 26-1, Carpenter 20 Cb-3, and AL6XN), coated pipe (for example, polyethylene- and polypropylene-coated pipe), and polyvinyl chloride (PVC) pipe. For operating pressures up to about 791 kpascal (about 100 psig), the preferred corrosion resistant material is PVC, and for operating pressures above about 791 kpascal (about 100 psig), the preferred corrosion resistant material is 316L grade stainless steel. (When an acid is used and the corrosion resistant material is PVC or stainless steel, the preferred acid is hydrochloric acid and sulfuric acid, respectively.)

The base-treated production fluid is then conducted, for example, to a storage facility (not shown) or a processing facility (not shown). In addition, the base-treated production fluid can be conducted to a separator 28 where the fluid is separated into an aqueous phase, an oil phase, and a gaseous phase which respectively exit the separator 20 via a conduits 30, 32, and 34. Optionally, at least a portion of the separated oil is recycled via a conduit 36 for injection into the produced fluid at a location upstream from the sulfur dioxide injector 14. The latter option is especially desirable when the produced fluid has a water cut or water content greater than about 95, or even about 90, volume percent based on the volume of the produced fluid.

The process of the present invention is conducted under temperature and pressure conditions typically present in the fluid transport conduit 12. The process is independent of pressures within the range present in the conduit 12. Generally, the pressure within the conduit 12 is at least about 101 kpascal (0 psig), with pressures up to 6996 kpascal (1,000 psig) and higher being not uncommon.

The reaction rate is temperature dependent, with the reaction time decreasing with increasing fluid temperature. (Typically, the reaction time is from a few seconds to less than about 15 minutes, and more commonly from about 10 seconds to about 10 minutes.) While fluid temperatures between about 40.6° to about 48.9° C. (about 105° to about 120° F.) are common, fluids having higher as well as lower temperatures can also be treated using the process of the present invention.

The time required for the reaction between hydrogen sulfide and sulfur dioxide to reduce the hydrogen sulfide concentration in the fluid to an acceptable level is also dependent upon the mole ratio of sulfur dioxide to hydrogen sulfide. When all other parameters are held constant, the reaction time decreases as the sulfur dioxide/hydrogen sulfide mole ratio increases.

EXAMPLES

The following examples are intended to illustrate, and not limit, the invention. Examples 1-4 demonstrate exemplary hydrogen sulfide concentration reductions in oil-containing fluids having a continuous aqueous phase using processes within the scope of the present invention. More particularly, Example 1 describes a field test conducted at an offshore platform and Examples 2-4 detail several laboratory experiments.

EXAMPLE 1

Field Test

A sidestream test loop was constructed with about 30.5 m (about 100 feet) of about 10.2 cm (about 4 inches) diameter 316L stainless steel pipe. A stainless steel in-line static mixer was placed upstream and downstream of the sulfur dioxide injection point. The outlet of the 10.2 cm (4 inches) stainless steel line was connected to a 9 barrel two phase separator constructed of carbon steel. The separated gas and liquid phases were combined at the outlet of the separator into a carbon steel line of about 5.1 cm (about 2 inches). Sample points were located (a) upstream of the sulfur dioxide injection point (sample point 1), (b-c) at the gas and liquid lines exiting the separator (sample points 2 and 3, respectively), and (d) about 30.5 m (about 100 feet) downstream of the separator in the carbon steel line (sample point 4). Sample point 4 corresponds to about a 9 minute residence time after sulfur dioxide injection.

The hydrogen sulfide of each assayed sample was measured in the vapor phase above the liquid phase of the sample. When mole ratios of sulfur dioxide to hydrogen sulfide of about 1.4 to about 3 were employed, the hydrogen sulfide content was significantly reduced from about 4000 ppm at sample point 1 to about 100 to about 1400 ppm at sample point 4. At sulfur dioxide to hydrogen sulfide mole ratios of about 3 to about 7, there was no measurable hydrogen sulfide in the vapor phase of samples taken at sample point 4. In addition, at the sulfur dioxide/hydrogen sulfide mole ratio levels of about 3 to about 7, hydrogen sulfide was not detected in the separated gas phase of samples taken at sample point 2 or in the water separated from the liquid phase samples obtained at sample point 3.

EXAMPLES 2-4

Laboratory Experiments

A synthetic brine stock solution was prepared with the salts listed below in Table 1.

TABLE 1

Synthetic Brine Stock Solution

| | |
|---|---|
| 1.71 g | $MgCl_2.6H_2O$ |
| 2.13 g | $CaCl_2.2H_2O$ |
| 93.06 g | NaCl |
| 2.73 g | $NaHCO_3$ |
| 0.14 g | $Na_2SO_4$ |
| 1.62 g | $SrCl_2.6H_2O$ |
| Dilute with distilled water to 4 L total volume. | |

The synthetic brine stock solution had a pH value of about 7 and was deaerated by bubbling nitrogen through the solution.

A sulfide stock solution was prepared by dissolving about 2.97 g $Na_2S$ in about 80 mL distilled water and neutralizing the solution with HCl to a pH value of about 7.

Each of the three laboratory experiments was conducted using the following protocol. A mixture of about 333 mL of the deaerated brine stock solution and about 37 mL of a dry degassed crude oil were sealed in a jar and heated to about 40.6° C. (about 105° F.). About 1 mL of the sulfide stock solution was added and the mixture was stirred vigorously for about a minute. Prior to sulfur dioxide treatment, an aliquot of the aqueous phase of the mixture was withdrawn and analyzed for dissolved hydrogen sulfide. Gaseous sulfur dioxide was then introduced rapidly via a syringe needle immersed in the mixture while stirring vigorously. The sealed jar was stirred for about 10 minutes. Next, the fluids in the sealed jar were allowed to separate and the hydrogen sulfide content of the aqueous phase was measured. The following Table 2 sets forth the results.

TABLE 2

| Example | Mole Ratio $SO_2/H_2S$ | Dissolved $H_2S$, Initial (mg/L) | Dissolved $H_2S$, Final (mg/L) | pH |
|---|---|---|---|---|
| 2 | 2.4 | 100 | 0.3 | 5.3 |
| 3 | 3.2 | 100 | 0.1 | 4.2 |
| 4 | 4.8 | 100 | 0 | 3.9 |

As indicated by the data in the above Table 2, complete removal of hydrogen sulfide was achieved at a sulfur dioxide/hydrogen sulfide mole ratio of about 4.8/1. The pH value of the aqueous phase of the mixture treated with sufficient sulfur dioxide to achieve the 4.8/1 mole ratio was about 3.9. A sulfur sludge (i.e., precipitated elemental sulfur) was not observed in the water phase of any of the mixtures formed in Examples 2-4. In addition, the oil phase of each of the mixtures of Examples 2-4 showed no evidence of a sulfur sludge (i.e., coagulated elemental sulfur).

Although the present invention has been described in considerable detail with reference to some preferred versions, other versions are possible. For example, the fluid (e.g., a sour water stream from an oil refinery or other aqueous stream having an unacceptably high hydrogen sulfide content) treated in accordance with the present invention can initially contain very little, if any, oil. In such an event, a sufficient amount of a petroleum material (such as crude or refined oil) is added to the fluid via conduit 36 to raise its oil content to at least about 5, preferably at least about 10, more preferably at least about 15, and most preferably at least about 20, volume percent based upon the volume of oil and water present in the fluid. Therefore, the spirit and scope of the appended claims should not necessarily be limited to the description of the preferred versions contained herein.

What is claimed is:

1. A method for removing hydrogen sulfide from a mixture comprising a continuous aqueous phase having a pH of at least 6 and a first oil phase, the method comprising the step of introducing a sufficient amount of sulfur dioxide into the mixture to form a treated mixture comprising a continuous aqueous phase having a pH less than 6 and a second oil phase, the pH of the aqueous phases being measured at ambient conditions and the treated mixture being substantially devoid of a sulfur sludge.

2. The method of claim 1 wherein the mixture further comprises a gaseous phase.

3. The method of claim 1 wherein a sufficient amount of sulfur dioxide is introduced into the mixture for the continuous aqueous phase of the treated mixture to have a pH of 5 or less.

4. The method of claim 1 wherein a sufficient amount of sulfur dioxide is introduced into the mixture for the continuous aqueous phase of the treated mixture to have a pH of 4 or less.

5. The method of claim 1 further comprising the step of introducing a caustic composition into the treated mixture to raise the pH of the aqueous phase of the treated mixture to at least 6, the caustic composition being introduced into the treated mixture when the hydrogen sulfide content of the vapor phase above an aliquot of the treated mixture is less than 50 ppmv.

6. The method of claim 1 wherein the method is a continuous process, and the method further comprises introducing a caustic material into the treated mixture to raise the pH of the aqueous phase of the treated mixture to at least 6, the caustic material being introduced into the treated mixture at a location (a) downstream from where the sulfur dioxide is introduced into the mixture and (b) where the vapor phase above an aliquot of the treated mixture is less than 50 ppmv.

7. The method of claim 1 wherein the continuous aqueous phase of the mixture has a hydrogen sulfide concentration of at least 5 ppm by weight and the amount of sulfur dioxide introduced into the mixture is sufficient for the aqueous phase of the treated mixture to have a hydrogen sulfide concentration of less than 5 ppm by weight.

8. The method of claim 1 further comprising a vapor phase over the mixture wherein the vapor phase over the mixture has a hydrogen sulfide concentration greater than 50 ppm by volume and the amount of sulfur dioxide introduced into the mixture is sufficient for the vapor phase over the treated mixture to have a hydrogen sulfide concentration of less than 50 ppm by volume.

9. The method of claim 1 wherein the amount of sulfur dioxide introduced into the mixture is sufficient for the ratio of moles of sulfur dioxide to moles of hydrogen sulfide in the treated mixture to be at least about 1.

10. A method for removing hydrogen sulfide from a mixture comprising a continuous aqueous phase having a pH greater than 6 and a first oil phase, the method comprising the steps of:
    (a) introducing a composition selected from the group consisting of sulfur dioxide and sulfur dioxide precursors into the mixture; and
    (b) introducing an acid into the mixture, the total amount of the composition and acid introduced into the mixture being sufficient to form a treated mixture comprising a continuous aqueous phase having a pH less than 6 and a second oil phase, the pH of the aqueous phases being measured at ambient conditions.

11. The method of claim 10 wherein at least a portion of step (a) is performed while performing step (b).

12. The method of claim 10 wherein the treated mixture is essentially devoid of a sulfur sludge.

13. The method of claim 10 wherein the composition comprises sulfur dioxide.

14. The method of claim 10 wherein the composition comprises a sulfur dioxide precursor selected from the group consisting of alkali metal sulfite, alkali metal bisulfite, ammonium sulfite and ammonium bisulfite; or mixtures thereof.

15. The method of claim 10 further comprising the step of introducing a caustic composition into the treated mixture to raise the pH of the aqueous phase of the treated mixture to at least 6, the caustic composition being introduced into the treated mixture when the hydrogen sulfide content of the vapor phase above an aliquot of the treated mixture is less than 50 ppmv.

16. The method of claim 10 wherein the method is a continuous process, and the method further comprises introducing a caustic material into the treated mixture to raise the pH of the aqueous phase of the treated mixture to at least 6, the caustic material being introduced into the treated mixture at a location (a) downstream from where the acid and the composition are introduced into the mixture and (b) where the vapor phase above an aliquot of the treated mixture is less than 50 ppmv.

17. The method of claim 10 wherein the continuous aqueous phase of the mixture has a hydrogen sulfide concentration of at least 5 ppm by weight and the total amount of the composition and acid introduced into the mixture is sufficient for the aqueous phase of the treated mixture to have a hydrogen sulfide concentration less than 5 ppm by weight.

18. The method of claim 10 further comrpising a vapor phase over the mixture wherein the vapor phase over the mixture has a hydrogen sulfide concentration greater than 50 ppm by volume and the total amount of the composition and acid introduced into the mixture is sufficient for the vapor phase over the treated mixture to have a hydrogen sulfide concentration less than 50 ppm by volume.

19. The method of claim 10 wherein the total amount of the composition and acid introduced into the mixture is sufficient for the ratio of moles of sulfur dioxide to moles of hydrogen sulfide in the treated mixture to be at least about 1.

20. A method for removing hydrogen sulfide from a mixture comprising a continuous aqueous phase having a pH of at least 6, the method comprising the steps of:
    (a) introducing a sufficient amount of an oil product to produce a modified mixture containing at least 5 volume percent of oil product and less than 95 volume percent water, the volume percents being based on the total volume of the modified mixture; and
    (b) introducing a sufficient amount of sulfur dioxide into the modified mixture to form a treated mixture comprising a continuous aqueous phase having a pH less than 6 and an oil phase, the pH of the aqueous phases being measured at ambient conditions and the treated mixture being devoid of a sulfur sludge.

21. The method of claim 20 further comprising the step (c) of separating the treated mixture into an aqueous composition and an oil composition.

22. The method of claim 20 further comprising the steps of:
    (c) separating the treated mixture into an aqueous composition and an oil composition; and
    (d) introducing at least a portion of the oil composition as the oil product in step (a).

23. The method of claim 20 wherein the water in the modified mixture has a hydrogen sulfide concentration of at least 5 ppm by weight and the amount of sulfur dioxide introduced into the modified mixture is sufficient for the aqueous phase to have a hydrogen sulfide concentration of less than 5 ppm by weight.

24. The method of claim 20 further comprising a vapor phase over the mixture wherein the vapor phase over the mixture has a hydrogen sulfide concentration greater than 50 ppm by volume and the amount of sulfur dioxide introduced into the modified mixture is sufficient for the vapor phase over the treated mixture to have a hydrogen sulfide concentration of less than about 50 ppm by volume.

25. The method of claim 20 wherein the amount of sulfur dioxide added into the modified mixture is sufficient for the ratio of moles of sulfur dioxide to moles of hydrogen sulfide in the treated mixture to be at least about 1.

26. A method for removing hydrogen sulfide from an untreated mixture comprising a first oil phase and a continuous aqueous phase, the method comprising the step of introducing a sufficient amount of sulfur dioxide into the untreated mixture to form a treated mixture with a pH less than 6 comprising a second oil phase and a continuous aqueous phase having a pH less than the pH of the continuous aqueous phase of the untreated mixture, the pH of the aqueous phases being measured at ambient conditions and the treated mixture being substantially devoid of a sulfur sludge.

27. The method of claim 26 wherein the continuous phase of the treated mixture has a pH less than 5.5.

28. The method of claim 26 wherein the continuous phase of the treated mixture has a pH less than 5.

29. The method of claim 26 wherein the continuous phase of the treated mixture has a pH less than 4.5.

30. A method for removing hydrogen sulfide from an untreated mixture comprising a first oil phase and a continuous aqueous phase, the method comprising the steps of:

(a) introducing a composition selected from the group consisting of sulfur dioxide and sulfur dioxide precursors into the untreated mixture; and
(b) introducing an acid into the untreated mixture, the total amount of the composition and acid introduced into the untreated mixture being sufficient to form a treated mixture with a pH less than 6 comprising a second oil phase and a continuous aqueous phase having a pH less than the pH of the continuous phase of the untreated mixture.

* * * * *